United States Patent
Rajalingam et al.

(10) Patent No.: US 9,772,806 B2
(45) Date of Patent: Sep. 26, 2017

(54) METHOD FOR PRODUCING PACKAGES OF PRINTED MATERIALS BY PRINTING MULTIPLE DOCUMENTS IN ORDER AS ONE PRINT JOB

(71) Applicant: KONICA MINOLTA LABORATORY U.S.A., INC., San Mateo, CA (US)

(72) Inventors: Sivaraman Rajalingam, Fremont, CA (US); Danny Naoshi Kumamoto, Garden Grove, CA (US); Hidetaka Yoshida, San Mateo, CA (US); Rakesh Pandit, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/629,393

(22) Filed: Feb. 23, 2015

(65) Prior Publication Data
US 2016/0246556 A1 Aug. 25, 2016

(51) Int. Cl.
*G06F 3/12* (2006.01)
(52) U.S. Cl.
CPC .......... *G06F 3/1226* (2013.01); *G06F 3/1205* (2013.01)
(58) Field of Classification Search
CPC ............................ G06F 3/1262; G06F 3/1205
USPC .................. 358/1.1, 1.9, 1.13, 1.15, 1.16
See application file for complete search history.

(56) References Cited

U.S. PATENT DOCUMENTS

| | | | | |
|---|---|---|---|---|
| 5,715,381 A | | 2/1998 | Hamilton | |
| 2004/0177336 A1* | | 9/2004 | Kujirai | G06F 3/1205 717/104 |
| 2007/0086042 A1* | | 4/2007 | Herold | G06F 3/1204 358/1.15 |
| 2009/0201528 A1* | | 8/2009 | Truong | G06F 3/1205 358/1.15 |
| 2011/0122441 A1* | | 5/2011 | Shiohara | G06F 3/1205 358/1.15 |
| 2012/0268763 A1* | | 10/2012 | Isobe | G06F 3/1206 358/1.13 |
| 2014/0247460 A1* | | 9/2014 | Gaertner | G06F 3/1205 358/1.15 |

* cited by examiner

*Primary Examiner* — Kent Yip
(74) *Attorney, Agent, or Firm* — Chen Yoshimura LLP

(57) ABSTRACT

A method implemented in a server computer for producing a package of printed documents from multiple original digital documents. A user specifies the multiple original digital documents, their order in the package, and print settings for each original digital document. The user further specifies additional print settings for the package. The server generates a combined digital document by combining contents of the plurality of original digital documents in the specified order, and generates a package job ticket that specifies print settings for the combined digital document in accordance with the print settings for the plurality of original digital documents. The server submits the combined digital document and the package job ticket as a print job to a printer. The printer executes the package print job to produce the multiple documents in the specified order which form a package of printer materials.

15 Claims, 2 Drawing Sheets

METHOD FOR PRODUCING PACKAGES OF PRINTED MATERIALS BY PRINTING MULTIPLE DOCUMENTS IN ORDER AS ONE PRINT JOB

BACKGROUND OF THE INVENTION

Field of the Invention

This invention relates to a method for managing printing of documents, and in particular, it relates to a method of printing multiple documents in order to produce packages of printed materials.

Description of Related Art

In practice there are often situations when multiple separate original digital documents need to be printed and assembled in predetermined orders to produce a package or set of printed materials. The required print setting (including finishing settings) for the multiple original documents may be different, for example, in terms of paper type and size, single or double sided printing, finishing requirements such as folding and stapling, etc. If multiple sets (i.e. copy count) is required, then multiple copies of the original documents need to be printed and assembled into sets. For example, a manufacturer of a product may need to produce a set of documents, all of which are printed individually and then assembled in a package and put in a single plastic sleeve to be delivered with the product. In a traditional print environment, such a print job would involve multiple different source files (e.g. Portable Document Format or PDF files), each of which would need to be sent to a printer as a separate print job (or sub-job), printed, finished and then combined with the other sub-jobs and inserted into a plastic sleeve for inclusion in the product packaging. It is possible for the user to send multiple print jobs to a printer sequentially to produce the set of printed materials, but such a method can be burdensome when multiple sets are produced.

SUMMARY

The present invention is directed to a method for producing packages of printed materials that substantially obviates one or more of the problems due to limitations and disadvantages of the related art.

An object of the present invention is to provide a simplified method to produce packages of printed materials containing an ordered set of multiple documents with diverse print settings.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented on a print server which is connected to a printer for producing a package of printed documents from multiple original digital documents, comprising: (a) receiving user inputs that specify a plurality of original digital documents to be printed in a specified order as a package job, the user inputs further specifying print settings for each of the plurality of original digital document; (b) receiving user inputs that specify a plurality of additional print settings for the package job; (c) generating a combined digital document by combining contents of the plurality of original digital documents, the combined digital document containing a plurality of parts in the specified order, each part corresponding to one of the plurality of original digital documents; (d) generating, in accordance with the print settings for the plurality of original digital documents, a package job ticket that specifies print settings for the combined digital document, wherein the print settings for each part of the combined digital document are in accordance with print settings for the original digital document corresponding to that part; and (e) submitting the combined digital document and the package job ticket as a print job to the printer.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provides a method for producing packages of printed materials arranged in order based on multiple original digital documents. The method combines the original documents into a single print job, referred to as a package job, then send the print job to one printer which can print a set of the documents consecutively, and print multiple sets of the documents consecutively. More specifically, the multiple original digital documents are combined to generate a single digital document, such as a single PDF document, which contains parts that correspond to the content of the multiple original documents in the desired sequence. A single print job ticket is also generated, which specifies print setting (including finish setting) requirements that reflect the requirements for parts of the single digital document corresponding to the individual original documents. The single digital document and the single print job ticket constitute a single print job which is sent to a printer. When executed by the printer, the single print job will produce the set of documents with desired printing (including finishing) requirements forming a set or package of printed materials. A user interface is provided to allow the user to specify the order of the individual documents to be printed.

Figure 2:
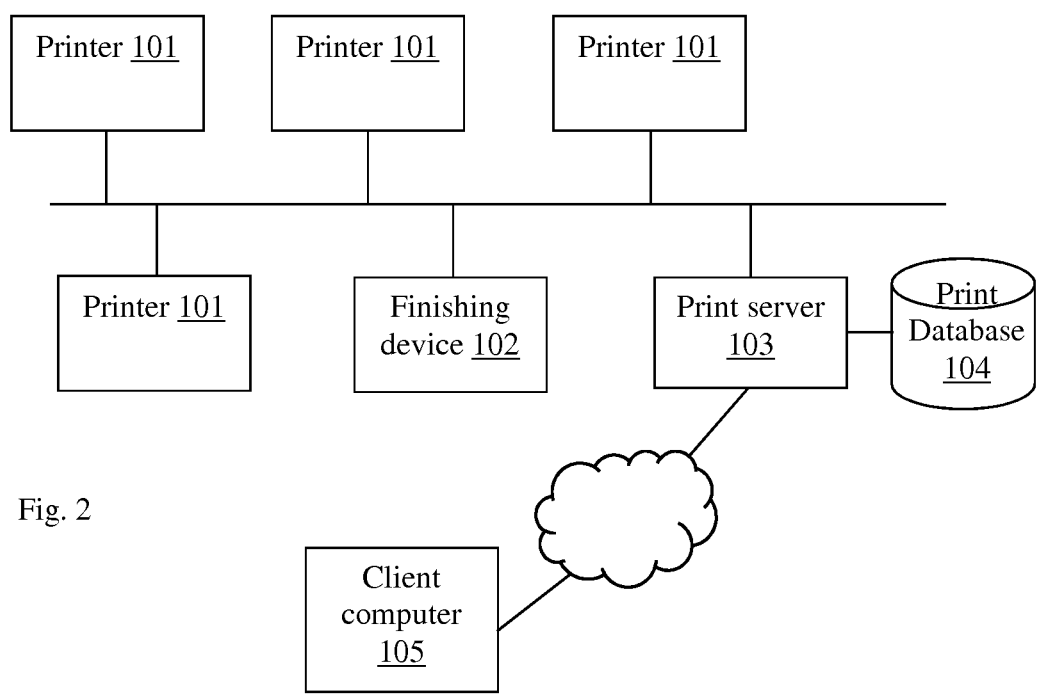
FIG. 2 schematically illustrates a printing system in which embodiments of the present invention may be implemented.

FIG. 2 schematically illustrates a printing system that may be used to implement embodiments of the present invention. The system includes one or more printers 101 (which may have certain build-in finishing functions such as stapling, hole punching, etc.), optional finishing devices 102, and a print server 103 connected to each other by a network. The print server 103 maintains a database 104 that stores various data including digital documents, print job tickets, etc. One or more client computers 105 communicates with the print server 103 via a network such as the internet to allow the user to place print orders. The method described here may be implemented by software programs stored in a memory and executed by processors of the server (not shown in the drawings).

Figure 1:
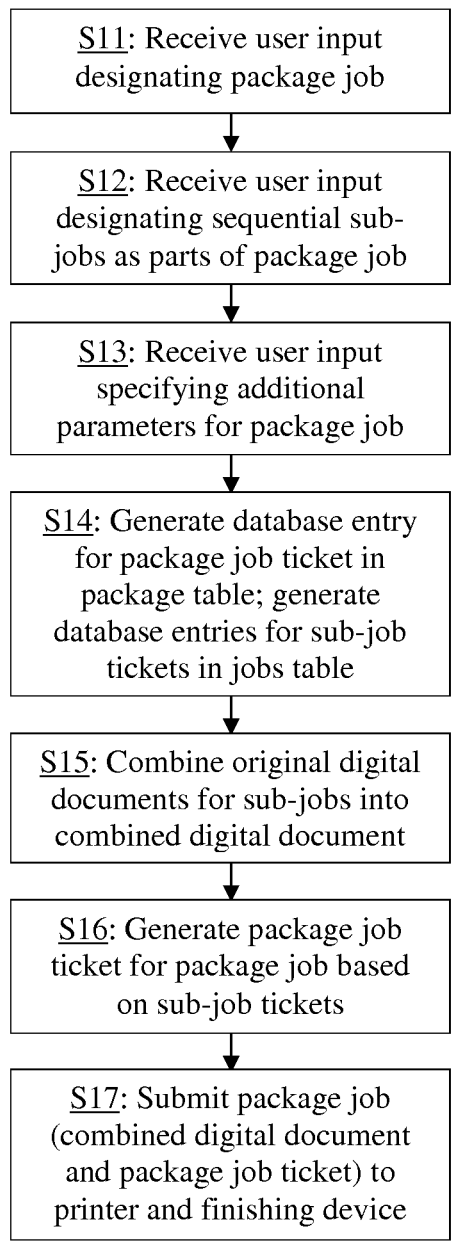
FIG. 1 schematically illustrates a method for producing packages of printed materials according to an embodiment of the present invention.

FIG. 1 schematically illustrates a method of producing a package of printed materials according to an embodiment of the present invention. In this embodiment, a package job is created by combining multiple print jobs (referred to as sub-jobs).

Using a graphical user interface (GUI) provided by the server, the user designates a package job (step S11), and designates sequential sub-jobs that will be parts of the package job (step S12). A sub-job may be designated a number of ways. One way is to specify an existing print job, which includes both the document to be printed (e.g. a PDF document) and an associated job ticket, as a sub-job. The existing job ticket specifies the print settings for this sub-job. The GUI may provide the ability for the user to manually modify the existing job ticket to change some of the print settings as desired. Another way is to specify a document, and manually specify the print settings for this document, as a sub-job, in a manner similar to when the user creates a normal print job. The GUI also provide the ability for the user to re-order the sub-jobs as desired.

If any of the original document is to be printed multiple copies within the package, the user specifies the number of copies for that original document in step S12. For example, this parameter may be in the form of a copy count parameter for that sub-job.

The user further specifies certain additional parameters for the package job (step S13), including at least the following parameters: copy count for the package job (i.e. the number of copies of the package to be produced); whether one or more cover sheets are to be inserted at the beginning of each set, such as a printed page (like a banner page) or unprinted sheet (slip sheet); and whether one or more cover sheets are to be inserted after each set.

The print settings for the package job and its sub-jobs are stored in the print database 104 on the server 103. For example, the server creates a database entry for each package job ticket in a package table, and creates database entries for the sub-job tickets in a jobs table (step S14). The jobs table may be the same jobs table that contains other job tickets of print jobs that are not a part of a package. For a print job that is a sub-job of a package job, its job ticket contains a foreign key reference to the package job it belongs to.

In one example, each database entry in the package table contains the following parameters: package ID, package name, package print status, package priority, number of sub-jobs in the package, etc. In one example, each database entry for a sub-job of a package contains the following parameters: job ticket ID; job ticket name; job status; number of copies for the job; print setting parameters such as paper settings, layout settings, finishing settings, etc., and package ID of the package it belongs to (i.e. the foreign key).

Then, the server combines the original digital documents (e.g. PDF documents) for the sub-jobs into a single digital document (e.g. PDF document), referred to as the combined digital document (step S15), and generates a job ticket for the package job (referred to as the package job ticket) which specifies the print setting requirements for the combined digital document (step S16). The combined digital document is generated by extracting the data from the individual digital documents and generating the combined digital document using the extracted data, taking into consideration relevant print settings (e.g., imposition settings) in the sub-job tickets. The page range of the combined digital document corresponding to each sub-job is calculated accordingly. To generate the package job ticket, the print settings for each part (page range) of the combined digital document that corresponds to an original document are set in accordance with the print settings in the corresponding sub-job ticket, taking into consideration print requirements whose effects have already been incorporated in the combined digital document. For example, if the individual original documents and print setting requirements are as shown in Table 1 (all pages are letter sized):

TABLE 1

Sub-job1: 10 pages
Sub-job2: 1 page, 4 copies
Sub-job3: 7 pages, staple
Sub-job4: 3 pages, punch
Sub-job5: 11 pages, adhesive binding then the page content of combined digital document will be as shown in Table 2:

TABLE 2

Pages 1-10: Sub-job1
Pages 11-14: Sub-job2 (1 page copied 3 times)
Pages 15-21: Sub-job3, staple
Pages 22-24: Subjob4, punch
Pages 25-30: Sub-job5 (6 pages generated by converting 11 pages into adhesive binding layout and imposing onto tabloid paper size)

It can be seen that the generation of the combined digital is not a simple concatenation of individual original digital documents, and the generation of the package job ticket is not a simple copying of print setting parameters from the sub-job tickets. For example, if a document is to be printed multiple copies within the package (as specified in the sub-job ticket), the data from that document is duplicated the prescribed number of times and included in the combined digital document. Meanwhile, the copy count in the sub-job ticket is not copied into the package job ticket. As another example, if a sub-job has impositions, the corresponding pages are created accordingly and included in the combined digital document. The types of impositions may include: 2-in-1, 2 repeat, booklet layout, adhesive binding layout, 4-in-1, 8-in-1 , etc. For n-in-1, the page range in the combined digital document that corresponds to this sub-job is calculated by taking into account the imposition; for example, 4-in-1 will reduce the page count by 3 for every 4 pages of the original digital document.

If the user has specified cover sheet(s) to be inserted at the beginning or end of the printed package, blank pages or pages with appropriate text may be added to the combined document at the specified locations. In the case of slip sheets, instead of inserting blank pages into the combined document, appropriate parameters may be added to the package job ticket to instruct the printer to insert blank sheets at desired locations.

Internal page numbers of the combined digital document are set consecutively, and the page numbers for the combined digital document are correlated with the page numbers of the individual original digital documents, so that the job ticket for the package job can refer to the page number of the combined digital document in order to set the print settings for the different parts of the combined digital document. If any original digital documents have their own page numbers to be printed on the pages, these page numbers are preserved as a part of the page image of the combined digital document.

Because the sub-jobs often have different print settings (including finish settings), page exceptions are used in the package job ticket to specify the settings that apply only to particular pages of the combined document corresponding to the relevant sub-jobs. When an original document is to be printed multiple times within the package, the print setting for the multiple repeated parts of the combined document corresponding to that original document are set according to the sub-job ticket for that sub-job (note that the copy count parameter of the sub-job ticket is not used).

The copy count of the package print job is set according to the copy count parameter specified by the user in step S13.

The combined document generated in step S15 and the package job ticket generated in step S16 constitute a print job (the package job) which can be handled by any suitable printers and finishing devices (if necessary) as a normal print job. The combined digital document has the same format as a normal digital document (e.g. PDF), and the package job ticket has the same format as a normal job ticket. The server submits the package job to a suitable printer (and finishing device if necessary) to be printed (step S17). When the print job is printed by the printer and finishing device (if necessary), the printed document contains the multiple original document arranged in the specified order (including multiple copies of any documents that have been specified to require multiple copies, and including any slip sheet(s) at the beginning and/or end of the package) and each according to the specified print settings, so that the printed document forms a package of printed materials. Also, multiple packages are printed according to the package copy count parameter in the package job ticket.

In the above described embodiment, the job ticket may be in any suitable job ticket format, such as JDF (Job Definition Format), Print Production Format (PPF), Portable Job Ticket Format (PJTF), etc. The digital document may be in any suitable format, such as PDF.

Because parts of the package jobs may have diverse finishing requirements, and the entire print job is required to be outputted to the same output tray in order to produce the multiple documents in the desired order, the printer will be required to have the ability to output printed documents having different finishing (in particular, different binding) to the same output tray.

As seen from the above descriptions, embodiments of the present invention provide the ability to combine all of the various finishing requirements for the multiple documents in the specified order into one print job which can be printed on one printer (and finishing devices if necessary) so that they are printed in sequence for each package. No special requirement is placed on the printer; the printer executes the package print job in the same way it executes a normal print job. Using the slip sheet(s) at the beginning and end of the package job, the user can easily separate the multiple sets of documents into separate packages.

An advantage of the printing method is that each set (package) will be printed in the correct order, as a single job as far as the operator and the printer is concerned, also, and importantly, while maintaining the different printing/finishing requirements of each sub-job. Multiple copies of each set can be easily be printed or reprinted, while ensuring that the correct order is preserved and the printed documents easily removed as a set from the printer.

The above described method can also achieve certain results that cannot be achieved by printing individual sub-jobs separately. For example, using the above method, it is possible to staple pages belonging to two or more sub-jobs together, by specifying a stapling setting that applies to a page range of the combined digital document that correspond to multiple sub-jobs.

It will be apparent to those skilled in the art that various modification and variations can be made in the printing method of the present invention without departing from the spirit or scope of the invention. Thus, it is intended that the present invention cover modifications and variations that come within the scope of the appended claims and their equivalents.

What is claimed is:

1. A method implemented on a print server which is connected to a printer for producing a package of printed documents from multiple original digital documents, comprising:
   (a) receiving user inputs that specify a plurality of original digital documents to be printed in a specified order as a package job, the user inputs further specifying print settings for each of the plurality of original digital documents, the print settings for each of the plurality of original digital document being external to the corresponding original digital document;
   (b) receiving user inputs that specify a plurality of additional print settings for the package job;
   (c) generating a combined digital document which is Portable Document Format (PDF) document by combining contents of the plurality of original digital documents, the combined PDF document containing a plurality of parts in the specified order, each part corresponding to one of the plurality of original digital documents,
   wherein the print settings for one of the plurality of original digital documents specify a copy count which is greater than one, and wherein step (c) includes duplicating a content of that original digital document and including the content multiple times in the combined PDF document according to the copy count;
   (d) generating, in accordance with the print settings for the plurality of original digital documents received in step (a) and the additional print settings received in step (b), a package job ticket that specifies print settings for the combined PDF document, the package job ticket being external to the combined PDF document, wherein the print settings for each part of the combined PDF document are in accordance with print settings for the original digital document corresponding to that part; and
   (e) submitting the combined PDF document and the package job ticket as a print job to the printer.

2. The method of claim 1, wherein the package job ticket is a Job Definition Format (JDF) file.

3. The method of claim 1, wherein in step (a) the user inputs specify a plurality of print jobs, each print job including a digital document which is one of the plurality of original digital documents and an associated job ticket which contains print settings for that original digital document.

4. The method of claim 3, wherein in step (a) the user inputs further modify the print settings contained in the job tickets of one or more of the print jobs.

5. The method of claim 1, wherein the additional print settings for the package include a slip sheet setting indicating whether a slip sheet is to be inserted at a beginning and/or end of the package job, wherein when the slip sheet setting indicates that a slip sheet is to be inserted at the beginning and/or end of the package job, step (c) includes inserting a blank page or banner page in the combined PDF document at its beginning and/or end.

6. The method of claim 1, wherein the additional print settings for the package include a package copy count setting indicating a number of copies of the package job to be printed.

7. The method of claim 1, wherein the print settings for a first one of the plurality of original digital document include a first finishing setting selected from folding, stapling, hole punching and binding settings, the print settings for a second one of the plurality of original digital document include a second finishing setting selected from folding, stapling, hole punching and binding settings, the second finishing setting being different from the first finishing setting, and wherein correspondingly, the print settings for a first part of the combined PDF document corresponding to the first one of the plurality of original digital documents include the first finishing setting and the print settings for a second part of the combined PDF document corresponding to the second one of the plurality of original digital documents include the second finishing setting which is different from the first finishing setting.

8. A computer program product comprising a computer usable non-transitory medium having a computer readable program code embedded therein for controlling a server computer which is connected to a printer, the computer readable program code configured to cause the server computer to execute a process for producing a package of printed documents from multiple original digital documents, the process comprising:
(a) receiving user inputs that specify a plurality of original digital documents to be printed in a specified order as a package job, the user inputs further specifying print settings for each of the plurality of original digital documents, the print settings for each of the plurality of original digital document being external to the corresponding original digital document;
(b) receiving user inputs that specify a plurality of additional print settings for the package job;
(c) generating a combined digital document which is Portable Document Format (PDF) document by combining contents of the plurality of original digital documents, the combined PDF document containing a plurality of parts in the specified order, each part corresponding to one of the plurality of original digital documents,
wherein the print settings for one of the plurality of original digital documents specify a copy count which is greater than one, and wherein step (c) includes duplicating a content of that original digital document and including the content multiple times in the combined PDF document according to the copy count;
(d) generating, in accordance with the print settings for the plurality of original digital documents received in step (a) and the additional print settings received in step (b), a package job ticket that specifies print settings for the combined PDF document, the package job ticket being external to the combined PDF document, wherein the print settings for each part of the combined PDF document are in accordance with print settings for the original digital document corresponding to that part; and
(e) submitting the combined PDF document and the package job ticket as a print job to the printer.

9. The computer program product of claim 8, wherein the package job ticket is a Job Definition Format (JDF) file.

10. The computer program product of claim 8, wherein in step (a) the user inputs specify a plurality of print jobs, each print job including a digital document which is one of the plurality of original digital documents and an associated job ticket which contains print settings for that original digital document.

11. The computer program product of claim 10, wherein in step (a) the user inputs further modify the print settings contained in the job tickets of one or more of the print jobs.

12. The computer program product of claim 8, wherein the additional print settings for the package include a slip sheet setting indicating whether a slip sheet is to be inserted at a beginning and/or end of the package job,
wherein when the slip sheet setting indicates that a slip sheet is to be inserted at the beginning and/or end of the package job, step (c) includes inserting a blank page or banner page in the combined PDF document at its beginning and/or end.

13. The computer program product of claim 8, wherein the additional print settings for the package include a package copy count setting indicating a number of copies of the package job to be printed.

14. The computer program product of claim 8, wherein the print settings for a first one of the plurality of original digital document include a first finishing setting selected from folding, stapling, hole punching and binding settings, the print settings for a second one of the plurality of original digital document include a second finishing setting selected from folding, stapling, hole punching and binding settings, the second finishing setting being different from the first finishing setting, and wherein correspondingly, the print settings for a first part of the combined PDF document corresponding to the first one of the plurality of original digital documents include the first finishing setting and the print settings for a second part of the combined PDF document corresponding to the second one of the plurality of original digital documents include the second finishing setting which is different from the first finishing setting.

15. A computer program product comprising a computer usable non-transitory medium having a computer readable program code embedded therein for controlling a server computer which is connected to a printer, the computer readable program code configured to cause the server computer to execute a process for producing a package of printed documents from multiple original digital documents, the process comprising:
(a) receiving user inputs that specify a plurality of original digital documents to be printed in a specified order as a package job, the user inputs further specifying print settings for each of the plurality of original digital documents, the print settings for each of the plurality of original digital document being external to the corresponding original digital document;
(b) receiving user inputs that specify a plurality of additional print settings for the package job;
(c) generating a combined digital document which is Portable Document Format (PDF) document by combining contents of the plurality of original digital documents, the combined PDF document containing a plurality of parts in the specified order, each part corresponding to one of the plurality of original digital documents,
wherein the print settings for one of the plurality of original digital documents specify an n-in-1 imposition setting, wherein a part of the combined digital document that corresponds to that original digital document is generated according to the n-in-1 imposition setting and wherein a page count of the part of the combined digital document is reduced from a page count of that original digital document according to the n-in-1 imposition setting;

(d) generating, in accordance with the print settings for the plurality of original digital documents received in step (a) and the additional print settings received in step (b), a package job ticket that specifies print settings for the combined PDF document, the package job ticket being external to the combined PDF document, wherein the print settings for each part of the combined PDF document are in accordance with print settings for the original digital document corresponding to that part; and (e) submitting the combined PDF document and the package job ticket as a print job to the printer.

* * * * *